United States Patent
Boe et al.

(10) Patent No.: US 6,239,564 B1
(45) Date of Patent: May 29, 2001

(54) STATE ADVANCE CONTROLLER COMMUTATION LOOP FOR BRUSHLESS D.C. MOTORS

(75) Inventors: Ronald S. Boe, Castaic; Robert W. Deller, Newhall; Robert C. Heagey, Acton, all of CA (US)

(73) Assignee: H.R. Textron, Inc., Santa Clarita, CA (US)

( * ) Notice: Subject to any disclaimer, the term of this patent is extended or adjusted under 35 U.S.C. 154(b) by 0 days.

(21) Appl. No.: 09/412,546

(22) Filed: Oct. 5, 1999

Related U.S. Application Data
(60) Provisional application No. 60/103,281, filed on Oct. 6, 1998.

(51) Int. Cl.[7] .................................................. H02K 23/00
(52) U.S. Cl. ............................................ 318/254; 318/439
(58) Field of Search ...................................... 318/254, 139, 318/438

(56) References Cited

U.S. PATENT DOCUMENTS

| | | | | |
|---|---|---|---|---|
| 5,159,246 | * | 10/1992 | Ueki ..................................... | 318/254 |
| 5,254,918 | * | 10/1993 | Ueki ..................................... | 318/254 |
| 5,280,222 | * | 1/1994 | Von Der Heide et al. .......... | 318/254 |
| 5,608,300 | * | 3/1997 | Kawabata et al. .................... | 318/254 |
| 5,729,102 | * | 3/1998 | Gotou et al. ......................... | 318/254 |
| 5,982,117 | * | 11/1999 | Taylor et al. ........................ | 318/254 |
| 6,014,000 | * | 1/2000 | Gutierrez ............................. | 318/254 |
| 6,051,943 | * | 4/2000 | Rabin et al. ......................... | 318/254 |

\* cited by examiner

Primary Examiner—David Martin
(74) Attorney, Agent, or Firm—Fulbright & Jaworski L.L.P.

(57) ABSTRACT

A method and system for advancing the state of commutation of an electronically commutated brushless D.C. motor. Impending motor stall is detected by measuring current flow through the motor windings to ascertain magnetic saturation. Upon such detection, a time sequence is started and if a change of state has not occurred within the time sequence, the state is advanced to the next succeeding state.

8 Claims, 9 Drawing Sheets

| TABLE 1. SIX SEQUENCE COMMUTATION | | |
|---|---|---|
| SWITCHES ON | | |
| PHASE | STATE 1 | STATE 2 |
| A | 1,6 | 3,4 |
| -C | 1,5 | 2,4 |
| B | 3,5 | 2,6 |
| -A | 3,4 | 1,6 |
| C | 2,4 | 1,5 |
| -B | 2,6 | 3,5 |

* TIMES ARE SELECTED FOR OPTIMUM PERFORMANCE

STATE ADVANCE CONTROLLER COMMUTATION LOOP FOR BRUSHLESS D.C. MOTORS

This application is based upon Provisional Application Serial No. 60/103,281, filed Oct. 6, 1998, and hereby claims benefit thereof.

BACKGROUND OF THE INVENTION

1. Field of the Invention

The present invention relates generally to electrical motors and more particularly to an improvement in the commutation loop for a brushless D.C. motor wherein enhancement of the torque characteristics of the motor is provided.

2. Description of the Prior Art

Brushless Direct Current (BDC) motors are well known in the art.

To make the motor rotate through a complete revolution, it is necessary to commutate the windings as a function of rotor position. Commutate means to change the direction of current in the proper coils at the proper time; brush type motors do this by the arrangement of the brushes and the commutation bars. For BDC motors, electronic switches are added along with a Rotor Position Sensor (RPS).

FIGS. 1 through 6 illustrate waveforms, circuits and the sequencing used in electronic commutation of BDC motors. This information is well known in the prior art and is included to assist in a better understanding of the present invention.

FIG. 1 schematically shows a typical brushless motor wound with three phases and the voltages seen between the phases when the motor is run as a generator of constant speed. Note that the motor is wound to provide overlapping, sinusoidal 3 phase voltages, electrically spaced 120° apart. In this example, the electrical degrees equal mechanical degrees; that is, the electrical spacing of the phase voltages corresponds to the rotor's physical position. Because the rotor has two poles, increasing the number of poles will increase the number of electrical cycles for each complete rotation of the rotor. The points of North/South balance for each winding occur where the voltages go through zero and reverse polarity. It is the method and type of winding, as well as the geometric and physical characteristics of the rotor and stator that create sinusoidal shape of the terminal voltage, the Back EMF (or BEMF) of the motor. The torque produced by a motor with a given winding and physical geometry is directly related to the voltage it produced when the rotor is externally driven, or when the motor is used as a generator. In fact, the motor torque constant, $K_t$, and the motor voltage or Back EMF constant, $K_b$, are equal when $K_t$ is expressed in Newton• Meters per Ampere and $K_b$ is expressed in Volts per Radian per Second:

$$K_t = K_b$$

This applies not only to the motor constants given in a manufacturer's data sheet, but also to the waveshape throughout the commutation cycle. In others words, if the BEMF waveforms are viewed as a function of rotor position on an oscilloscope, then, when a constant current is applied to the motor, the torque as a function of rotor position will vary in a similar manner, ignoring armature reaction effects. Such is illustrated in the waveforms of FIGS. 2 and 3.

There is a logical way to decide when to commutate a brushless motor in general cases. It is known that commutating at the zero crossing of the BEMF waveform is not a good place to start since there is no resultant torque no matter how much current is injected into the phase. Peak torque per unit current for a running motor is achieved at the peak of the BEMF waveform and it is desirable that the motor run smoothly, i.e., to transition smoothly between commutation cycles.

The commutations points for the motor in FIG. 3 are shown in FIG. 2 at the beginning of the shade areas. These commutation points center the peak of the BEMF waveform in the commutation zone, and provide equal sharing of the motor phases in the process of producing torque.

Due to the commutation points, however, the variation in the $K_t$, of the motor is approximately 50% for the BEMF waveshape shown. That means that for a constant current input, the torque output over each commutation zone will vary by 50%. In some applications, such as ventilators or pumps, this may be acceptable. To improve this variation of torque during commutation, called torque ripple, the scheme as shown in FIG. 3 may be used.

In this case, commutation occurs twice as often during one revolution by using the negative half of the BEMF waveform as well as the positive half. The torque now falls approximately 13% below the peak. For a three phase motor, with the simple commutation scheme shown, this is the best that can be accomplished with the BEMF waveform of this particular motor.

The torque output of the motor can be seen effectively as a ripple which follows the application of the voltage to the stator coils of the brushless D.C. motor. For a given load when the motor is driven toward its limits (that is, maximum currents applied to the stator coils) the rotor will have a tendency to stall as the load increases. This stall usually occurs at a minimum torque point in the torque curve. In the prior art, this problem has been overcome by utilizing a larger motor to provide more torque to drive a given load or alternatively to enhance the characteristics of the motor by utilizing more exotic magnetic materials therein. In either case, additional costs are incurred to drive a given load to thereby meet the load driving specification required.

In brushless D.C. motors it is necessary to commutate the applied voltage so that only peaks of the applied A.C. multiphase voltage waves are applied to the coils of the stator of the motor in order to properly drive the rotor. In order to accomplish such commutation, means is provided to sense the rotor position (usually Hall effect devices) and to activate appropriate switches (usually transistors) to apply the voltage to the proper coils of the stator at the proper times. The sensor devices are positioned at pre-determined positions angularly about the rotor and as the rotor passes a sensor position it may be viewed as going from a non-active to an active position thereby providing an output which may be used to generate a signal for activating a switch. Such may be viewed as a change of state of the sensor device.

One such form of commutation which may be used is illustrated in FIGS. 4 and 5 and Table 1 of FIG. 6 and is referred to as a six sequence commutation. Six sequence commutation takes advantage of the three phases as shown in FIG. 3. Looking left to right, a positive or negative peak occurs in one of the phases every 60 electrical degrees: positive peak in phase A, negative peak in phase C, positive peak in phase B, negative peak in phase A, positive peak in phase C, and negative peak in phase B. These 60 degree ranges then repeat as the motor is rotated in the same direction. Each phase has a positive and negative 60 electrical degree operating range containing a peak. Each of the six ranges represents the optimum rotor position for application of current to that phase to produce torque.

Reversing voltage and current polarity into the three negative operating ranges will produce torque in the same direction as unreversed current in the three positive operating ranges. FIG. 4A illustrated a continuous rotating torque if the current polarity is switched going into the negative operating ranges. The correct sequencing of phase current into the six operating ranges to provide continuous rotating torque is called the six sequence commutation method. Current is switched to each phase in this sequence with the polarity indicated: A, −C, B, −A, C, −B (repeats).

Rotor position feedback from the three Hall effect devices indicates the rotor magnet positions relative to the winding phases. The switching amplifier uses this positional information to control when power is switched and reversed to the phase and operating range next in sequence. FIG. 4B shows the outputs from the three Hall devices labeled sensor A, B, and C. The Hall effect devices as shown indicate exactly six rotor positions and the optimum switching points. Each Hall effect device is in phase and centered with the positive and negative operating ranges of one phase.

Six MOSFET switches (FIG. 5) in the switching amplifier provide the voltage and current reversals for rotation. The Hall effect device feedback and the commutation circuitry determine the switching sequence of the six MOSFETS. FIG. 5 shows the MOSFET arrangement, and Table 1 lists the MOSFET sequence used for powering each phase. During any sequence only two pairs of switches power one phase. The remaining MOSFET pair is turned off. Six sequence commutation and motor rotation are achieved with this arrangement of MOSFETS operated according to Table 1.

The change of state of a sensor device will also be at the minimum torque point on the output torque curve for the brushless D.C. motor. When the motor is driven by applying the maximum applicable current and it, therefore, is in saturation or near saturation, that is the application of more current to the stator windings will not produce additional output torque, then the motor is in a condition where it will stall when trying to drive a given load.

SUMMARY OF THE INVENTION

In accordance with the present invention, it has been found that if the commutation switching is caused to skip or jump to the next succeeding state when the motor is within its current limitations and the commutation state has not changed within a predetermined time, then the torque characteristics of the motor are enhanced. The basic concept is to determine that the motor is in a condition such that it is approaching stall and to then change the energization of the stator to the next succeeding commutation cycle in order to apply additional torque to the rotor thereby preventing the stall. In order to accomplish this, it is first necessary to provide means for detecting that the motor is in its current limitation state. When such is detected, a timer is activated. After the timer is activated and while it is counting for a pre-determined period of time, a means is also provided to detect whether or not the motor shaft has rotated in such a manner that there has been provided a change of state in the commutation. If no change of state has occurred within the pre-determined time, then the commutation is advanced to the next succeeding state.

BRIEF DESCRIPTION OF THE DRAWINGS

Referring now to FIG. 7 there is illustrated a typical block diagram of a controller commutation loop. As shown three Hall sensor signals A, B and C representative are applied to the Hall to state generator 10. From the A, B and C digital inputs the Hall to state generator provides one of six motor states to commutate and appears at the output of the Hall to state generator 10. That signal is applied to the State to Bridge Logic circuit 12 and based on the state and the direction of rotation that the motor is commanded to go, the pair of transistors in a six transistor bridge switch (FIG. 5) to be activated is determined. That is, the State to Bridge Logic 12 has applied as input signals the direction of rotation of the motor (dir), the current limit of the phase winding (Ibim) and the duty cycle (duty) as well as the state of the motor from the Hall to state generator 10. From these signals and through application of appropriate logic, the switch pair to be activated is determined. For example, by reference to FIGS. 4, 5 and 6 when Phase A is to have current applied in State 1, switches 1 and 6 will be closed.

Figure 7:
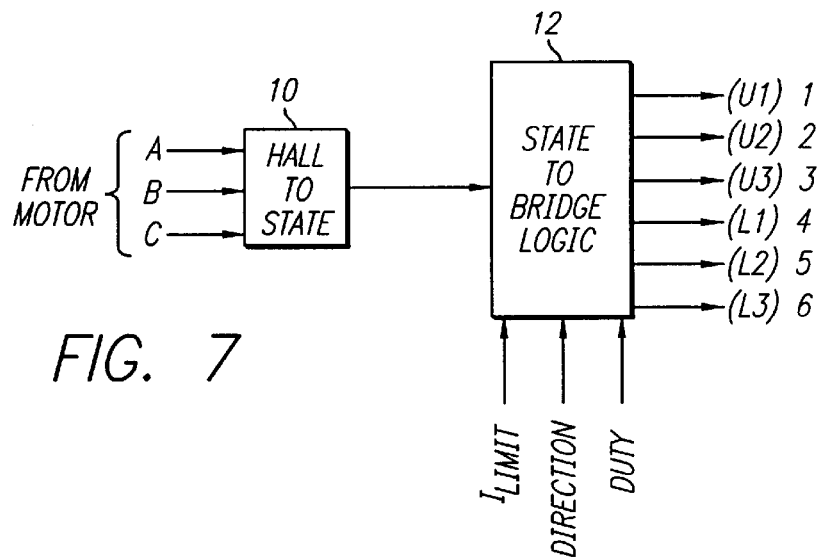
FIG. 7 is a block diagram of a typical commutation loop.
Figure 8:
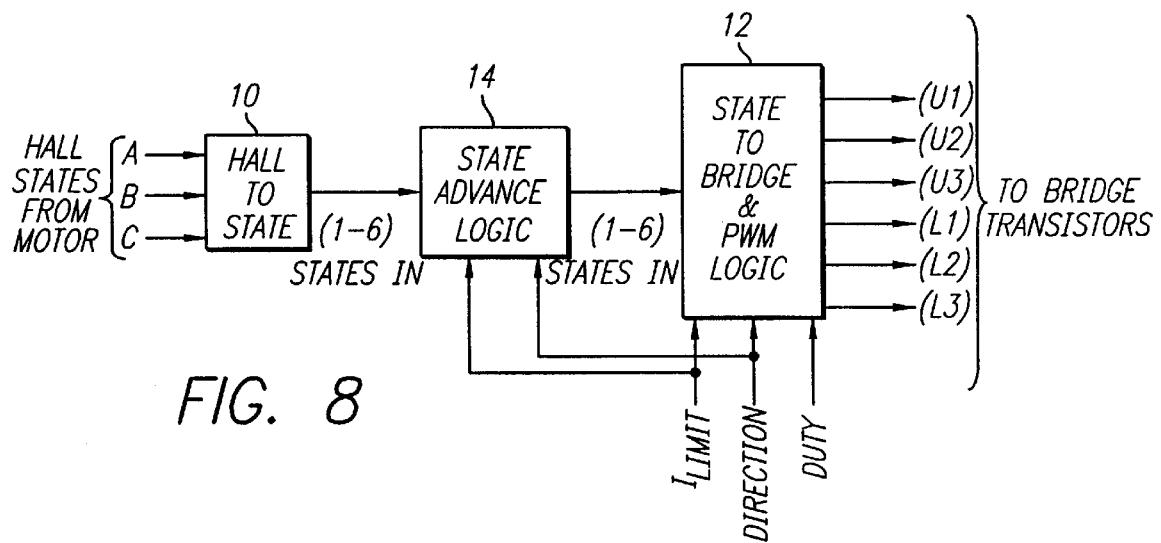
FIG. 8 is a block diagram of a state advance controller commutation loop in accordance with the principles of the present invention.

Referring now to more particularly to FIG. 8 there is illustrated a state advance controller commutation loop in general schematic block diagram form in accordance with the principles of the present invention. As is illustrated therein, the Hall to state generator 10 and the state to bridge logic 12 are identical to those shown in FIG. 7. Provided however in the state advance controller commutation loop of FIG. 8 is the state advance logic 14. As is indicated, the 1–6 states from the Hall to state generator 10 are applied to the state advance logic 14. Also applied is the current limit of the motor which is a feedback from the brushless D.C. motor, as well as the direction of rotation of the motor. These two informational signals are applied both to the state advance logic 14 and to the state to bridge logic 12. Through the utilization of these signals, as well as a detection of the state changes from the sensors that provide the signals A, B and C, the state of the brushless D.C. motor may be advanced. As is also noted, there is a duty cycle signal applied to the state to bridge logic 12. The duty cycle is a signal that switches at a high frequency of approximately 20 kilohertz or the like to turn the switching transistors on and off at a duty cycle proportional to the voltage that you actually want to apply across the coil in order to obtain the output torque of the motor.

Figure 1:
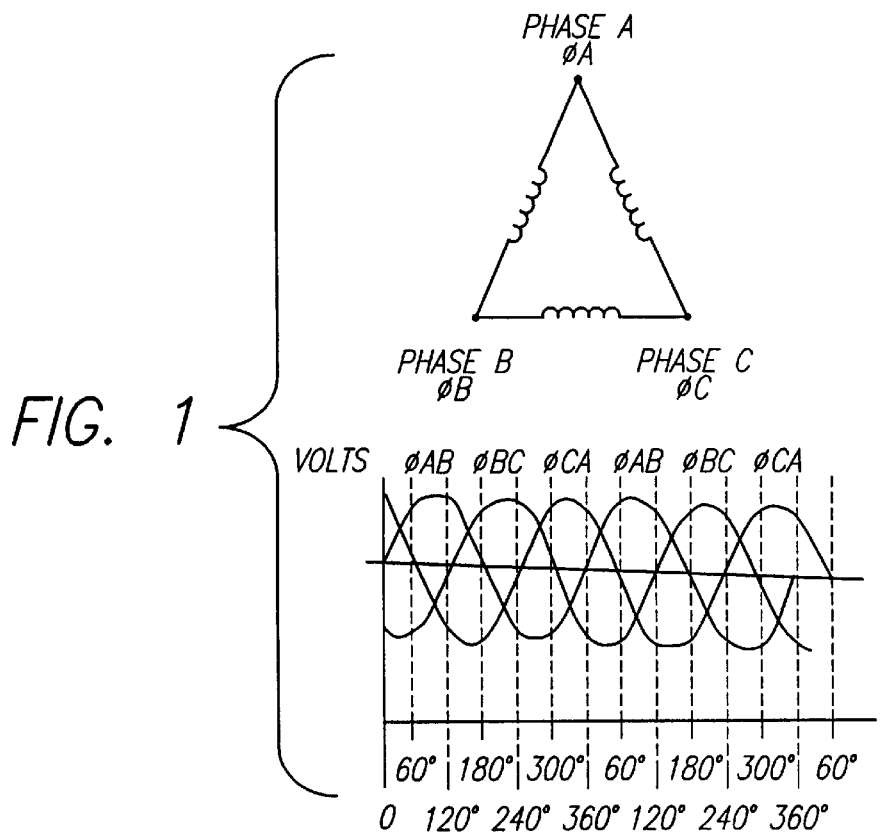
FIG. 1 is a schematic diagram of a three phase generator and the output voltage.
Figure 2:
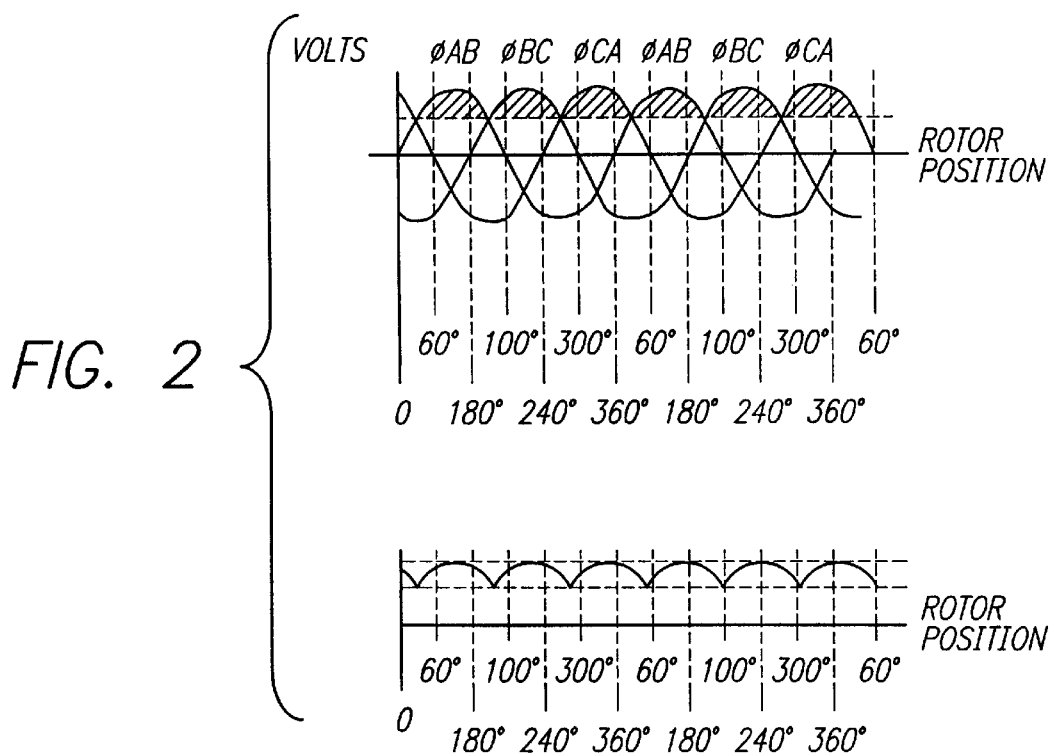
FIG. 2 is a schematic diagram of a waveform similar to that shown in FIG. 1 with commutation positions illustrated at FIG. 2A and torque ripple in FIG. 2B.
Figure 3:
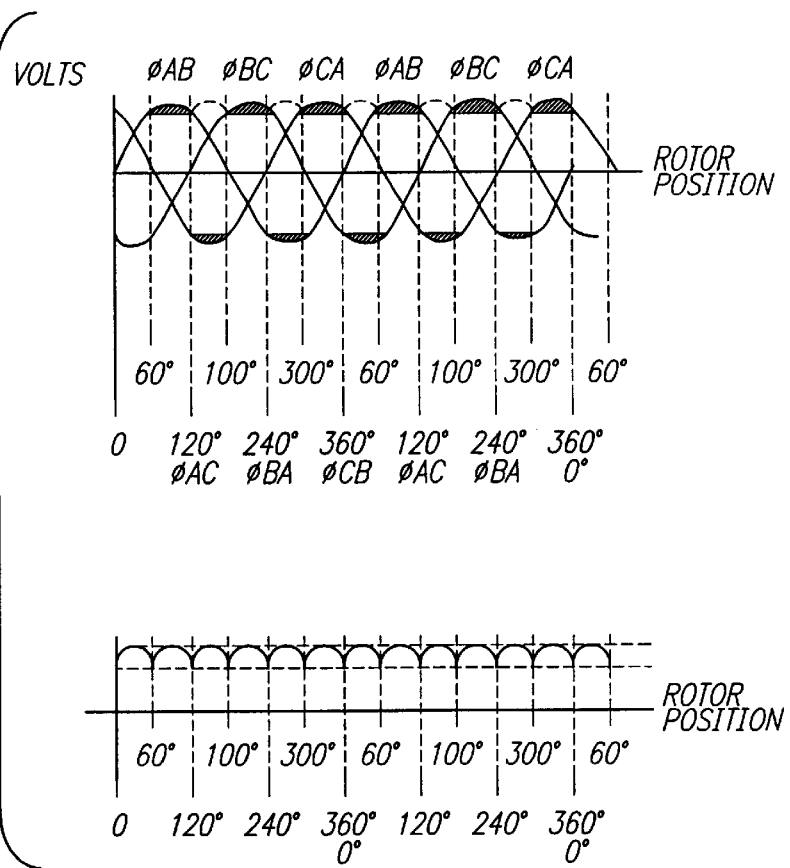
FIG. 3 is similar to FIG. 2 with positive and negative commutation and the resultant torque ripple.
Figure 4:
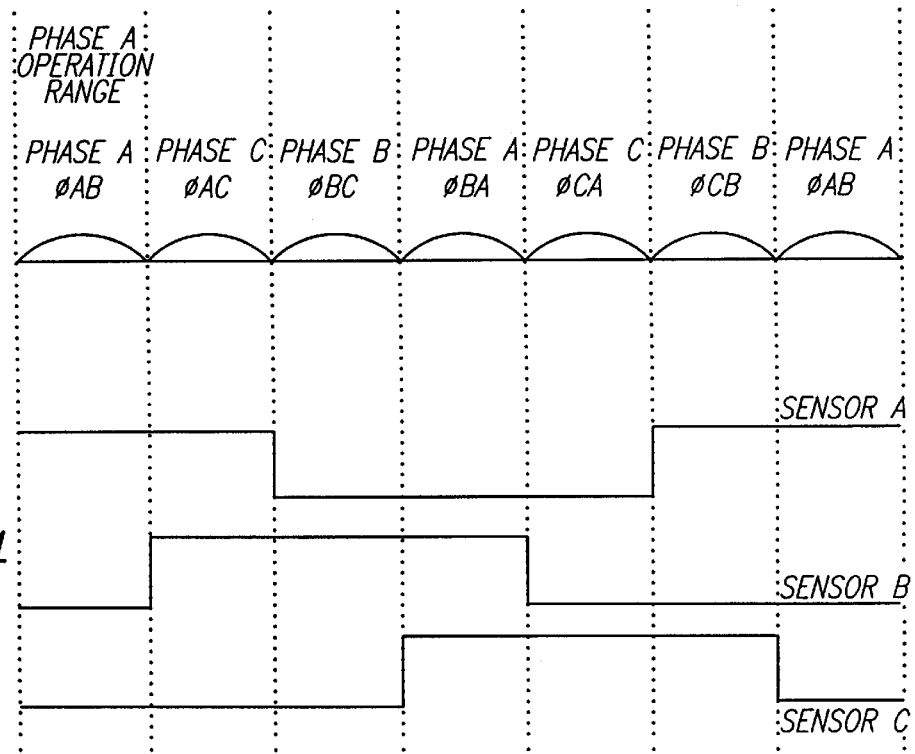
FIG. 4 is graph showing the on and off conditions of the Hall effect sensors and the application of current to the windings as shown in FIG. 3A.
Figures 5, 6:
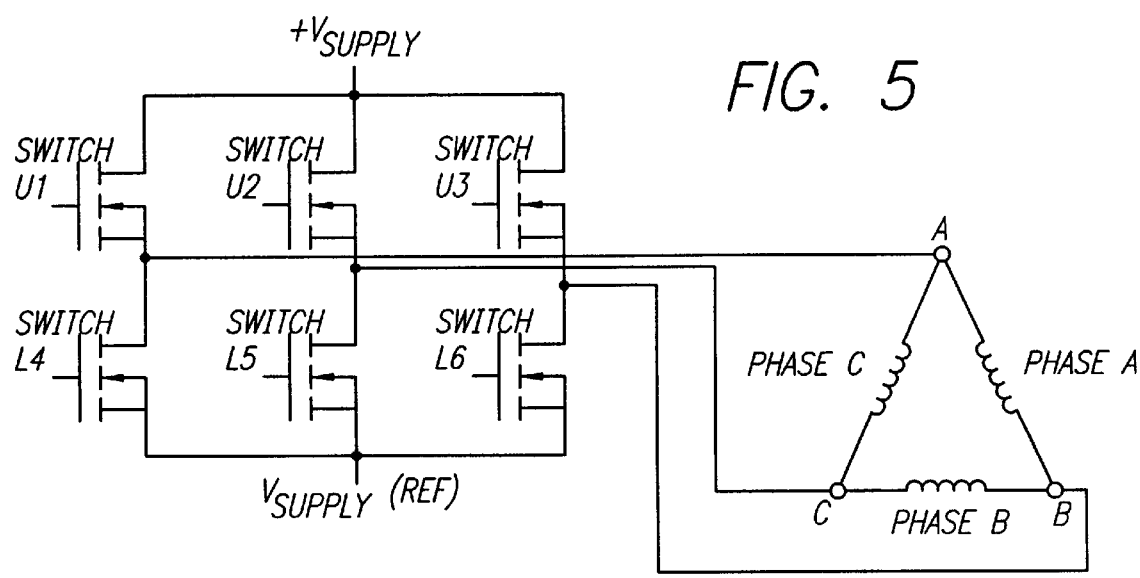
FIG. 5 is a schematic diagram of a plurality of switch pairs which when activated in a predetermined sequence will apply current to the windings of the motor as illustrated in FIGS. 3 and 4.
FIG. 6 is a table setting forth the operation of the switches of FIG. 5 to accomplish the application of the current to the windings as shown in FIGS. 3 and 4.

As can be seen from FIG. 4 when one of the Hall sensors A, B or C changes state, that is, moves from a high state to a low state or a low state to high state the commutation changes as is illustrated in FIG. 4A. Another way of viewing this is that the energization which is applied to the rotor of the motor changes depending upon the rotor position as illustrated in FIG. 3A. For example, if the energization is at Ø AB and sensor B moves from a low state to high state as shown in FIG. 4B then the energization by proper actuation and deactuation of the switches as shown in FIG. 5 is changed from Ø AB to Ø AC. Likewise, when the sensor A changes from a high state to a low state, the energization changes from Ø AC to Ø BC as shown in FIG. 3A. This is also again illustrated in FIG. 4A on the torque ripple curve. As long, as the change of states of the sensors occur in an orderly fashion the energization of the stator coils is maintained in the proper sequence and the rotor position continues to change in the direction commanded. However, it has been found that when the torque curve is at a minimum, for example, as shown at 20 on FIG. 4, if the current exitation to the stator coils is at a maximum there is the possibility that the motor will become stalled unless a higher torque is applied to cause the rotor to move from the position as shown at 20. In accordance with the principles of the present invention, it is therefore necessary to detect when the motor is approaching a stall condition and to then advance this state one position forward (the next succeeding state) in order to provide an increase in torque and to continue the motor's rotation in the desired direction.

To detect when a stall condition is being approached, means is provided to determine whether or not the current exitation being applied to the coil is at its limit, that is, the stator coils are becoming magnetically saturated. Once the current limit information is obtained, a timer is Activated and is caused to run for a pre-determined period of time. If during that period of time, one of the sensors A, B and C as shown in FIG. 4 changes state, then there has been a progression to the next successive energization cycle and nothing further is required. If however during the time that the timer is running and before it has timed out, if no change of state in the sensors A, B and C has occurred, it is then presumed that the motor is approaching its stall state. A signal is then generated to cause the exitation to move to the next immediately successive energization cycle irrespective of whether one of the sensors A, B or C has changed state. That is, by viewing FIG. 4, the Ø AB torque curve is approaching its minimum position as illustrated at 20 and the current limit for the motor has been reached. If the rotor does not rotate through a position such that sensor B changes state from low to high during the timer pre-determined period, then a signal is generated which automatically causes the exitation to the rotor to move from Ø AB to Ø AC even though sensor B has not changed state from low to high. By so doing, an increase in torque is caused simply because a jump in the state has occurred from Ø AB, which is on a descending portion of the curve, to Ø AC which is on the increasing portion of the torque curve. This increase in torque will overcome motor stall and cause the motor to continue to rotate in the desired direction unless the motor is truly stalled.

In some instances, even though there has been a change or bump to the next succeeding state in the torque curve, it is possible that the load on the rotor is so great that it is no longer capable of continuing rotation in the desired direction, i.e., the motor is truly stalled. If such occurs, then the exitation to the rotor is returned to the original state, that is, by referring to FIG. 4 from Ø A.C. back to Ø AB and the assumption is made that the motor is truly stalled and the rotor cannot be made to rotate further. This is accomplished by starting a second timer when the first timer times out and no change in state has occurred, if the second timer times out for its pre-determined time period without a change of state of one of the sensors A, B and C, then at that time, the exitation is returned to the immediately preceding state as above described.

Although the predetermined times for the first and second timers may be any desired it has been determined that the preferred time during which the first timer runs, after detection that current limit has been reached, is approximately 10 milliseconds and the time during which the second timer operates has been determined to be preferably approximately 5 milliseconds. The first timer is referred to herein and in the flow charts which will be discussed hereinafter as the "bump timer" indicating that when this timer times out, the torque curve is bumped to the next succeeding position and the second timer is referred to hereinafter as the "pulse timer".

It should be recognized that if during either of the time out periods for the bump timer or the pulse timer the Hall sensors change state, then the timers are reset and the bump to the next state is eliminated. This occurs because it has now been detected that the rotor has actually rotated past the position at which the Hall sensor changes state and the next succeeding exitation curve has been applied and therefore it is not necessary to advance or bump the state.

If the pulse timer is not utilized in the system, then the torque would immediately fall to a level below that shown at 20 in FIG. 4, thus causing the rotor to start rotating in the opposite direction until a change in state of one of the sensors A, B and C is detected. At that time, exitation will again be applied in the desired direction of rotation for the motor. The motor would then attempt to rotate forward until the current limit is reached and the motor stalls at which point it would then again rotate backwards. This can be viewed as a relaxation oscillation within the motor which, under preferred conditions, should be avoided. However, it has been found that with the bump state controller commutation loop in accordance with the present invention, performance of the motor is substantially enhanced even though the rotation of the rotor is allowed to reverse itself by one or two rotations. It has been found that even with such relaxation oscillation type of activity, there is still a 20% increase in the torque and position rotation of the motor which is a substantial improvement over motors without the state advance or bump, as above described.

Typically what will occur during operation of the state advance controller commutation loop in accordance with the principles of the present invention, is that the exitation of the stator coils will be advanced to the next succeeding state at the conclusion of the expiration of the 10 millisecond time for the bump timer and it will almost immediately move into the next state substantially before the 5 millisecond pulse timer has timed out. This occurs because an additional and substantial amount of torque has been applied to the rotor and it has accelerated and has started moving very quickly. Thus, it will pass through the position at which a sensor will change state and the timers are then both reset. As the motor continues to rotate in the desired direction and the load becomes larger and larger, then the bumps in state become less and less helpful, so that the time required to advance to the next state increases more and more until the 5 millisecond timeout for the pulse timer is exceeded without a change in state and it is at this point that the motor is truly stalled and must be returned to its last succeeding state.

Figure 9:
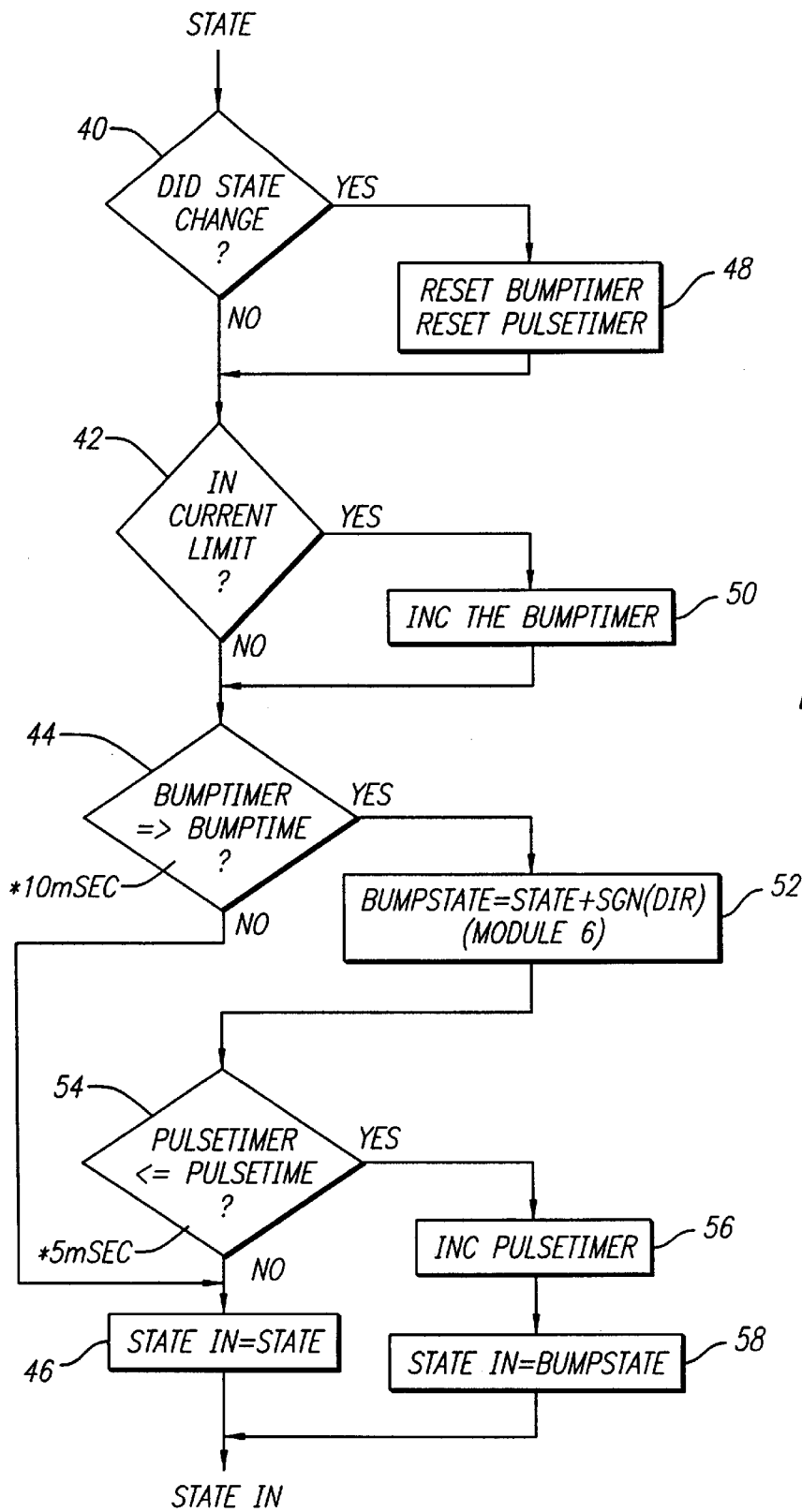
FIG. 9 is a flow chart illustrating the manner in which the state advance occurs in accordance with the preferred embodiment of the present invention.

Referring now more particularly to FIG. 9 there is shown the State Advance Block Logic Flow Chart will is illustrative of the foregoing discussing regarding bumping to the next immediate state or when both timers time out returning to the immediately preceding state. Prior to preceding through a step-by-step analysis of the flow chart as shown in FIG. 9, it should be recognized that the procedure illustrated in FIG. 9 is being processed continuously at a frequency which is substantially higher than the fastest frequency at which the sensors A, B and C can be Activated to cause a change of state signal to be generated when the motor is rotating at its fastest speed. Typically, the process is being operated at a frequency of approximately 1 megahertz. Although it may be somewhat faster or somewhat slower while the fastest that the state can change in the motor is only on the order of 100 microseconds. Thus, it can be seen that since the logic path as shown in FIG. 9 is being processed at the clock frequency (on the order of 1 megahertz) it is being processed in such a fashion that in almost every pass through the flow chart of FIG. 9, the answer to almost every query will be NO. As a result, the timers will not be activated and the bumping will not occur in the normal state of operation. For purposes of simplicity and clarity of description, the following discussion will be given without consideration of the frequency with which such normally occurs.

As in shown in FIG. 9, there is provided a block 40 which determines whether or not the state has changed since the last process through the flow chart. If the answer is no, then automatic progression occurs to the next block 42 which determines whether or not the motor is in current limit. If the answer to that is no, then automatic progression to the next block 44 in the flow chart determines whether or not the bump timer time is equal to or greater than the bump time, which as above discussed and is indicated on FIG. 9 is preferably approximately 10 milliseconds. Since no current limit was detected in the block 42 the answer to the block 44 question is NO and there will be an immediate bypass to the block 46 which indicates that the State In is qual to the State and this progresses out to State In and the entire operation again repeats itself. As can be seen when progression through the blocks as shown in the flow chart of FIG. 9 results in the answer to the queries as NO, it can be viewed that there is a direct fall through to all of the no's, thus causing the process to immediately repeat itself on the next clock cycle.

If when the process starts and the signal is applied to block 40 the answer to the state change is YES then as illustrated by the block 48 the bump timer and pulse timers are both reset. This automatically occurs whether or not these timers have been in fact activated. The output of the block 48 is then applied to the block 42 to determine whether or not the motor is in current limit. If not, the process continues as above described. However, if the answer is YES that the motor is now detected as being in current limit, then as indicated by the block 50 the bump timer is started. That is, it is incremented, thus causing it to commence to count. The output then of the bump timer is applied to the input to the block 44 such that the amount of time which the bump timer has been functioning is applied to block 44 and the determination is made as to whether or not the time during which the bump timer has been running is equal to or greater than the bump time, that is, 10 milliseconds. If the answer is NO, it merely progresses as above indicated. If however the answer is YES, then the signal is applied to the block 52 which activates the bump state causing the excitation to be applied from the next succeeding excitation state, as above described. That is, the torque is bumped from the state in which it resides to the next succeeding state. As indicated in FIG. 8, the current limit has been detected and the direction has been detected and thus the bump state equals the state plus the sign of the direction of rotation, that is either positive or negative. Thus, if the state is at state 4 and the motor direction is positive, the next state will be 5.

The output of the block 52 is applied to block 54 which determines whether or not the pulse timer is less than or equal to the pulse time. Since when the bump state was initiated the pulse timer has not yet been started, the answer to that question would be YES and as a result, the output would be applied to the block 56 which would activate the pulse timer. That is, it would increment it and start it functioning. When such occurs, the output from the block 56 is applied to the block 58, which indicates that the state which the motor is in is the bump state. This would be applied as the output signal for the state insofar as the motor is concerned, that is the State In is equal to the Bump State. This process would now continue upon each clock sequence until such a time as block 54 detects that the pulse timer has progressed through its approximate 5 millisecond timeout period. When this occurs, the answer to the question of whether the pulse timer is less than or equal to the pulse time, is going to be NO and when such occurs, the output is applied to the block 46, which indicates that the State In which the motor is at is the appropriate state and such will be the output of the flow chart of FIG. 9. Thus, the motor will be caused to return to the immediately preceding state, in which it existed prior to the application of the bump state signal, thus, indicating that the motor is truly stalled.

It should be understood that in accordance with the present and preferred implementation of the present invention, there are only six states as shown in FIG. 4 namely Ø AB, Ø AC, Ø BC, Ø BA, Ø CA and Ø CB. Thus, if the motor is rotating, for example, in a clockwise or positive position and the bump signal is applied and the torque was in state 4 (Ø BA), then the bump state will become state 5 (Ø CA). If the direction however is in the reverse, that is counter clockwise or negative, then the bump state will become state 3 (Ø BC). However, if the state is state 6 (Ø CB), then in the positive direction the next state will become 1 (QAB), since there is no state 7. Similarly, if the rotation is in a negative direction and the motor is in state 1 (Ø AB), then the next state will become state 6 (Ø CB), since there is no 0 state.

Figure 10:
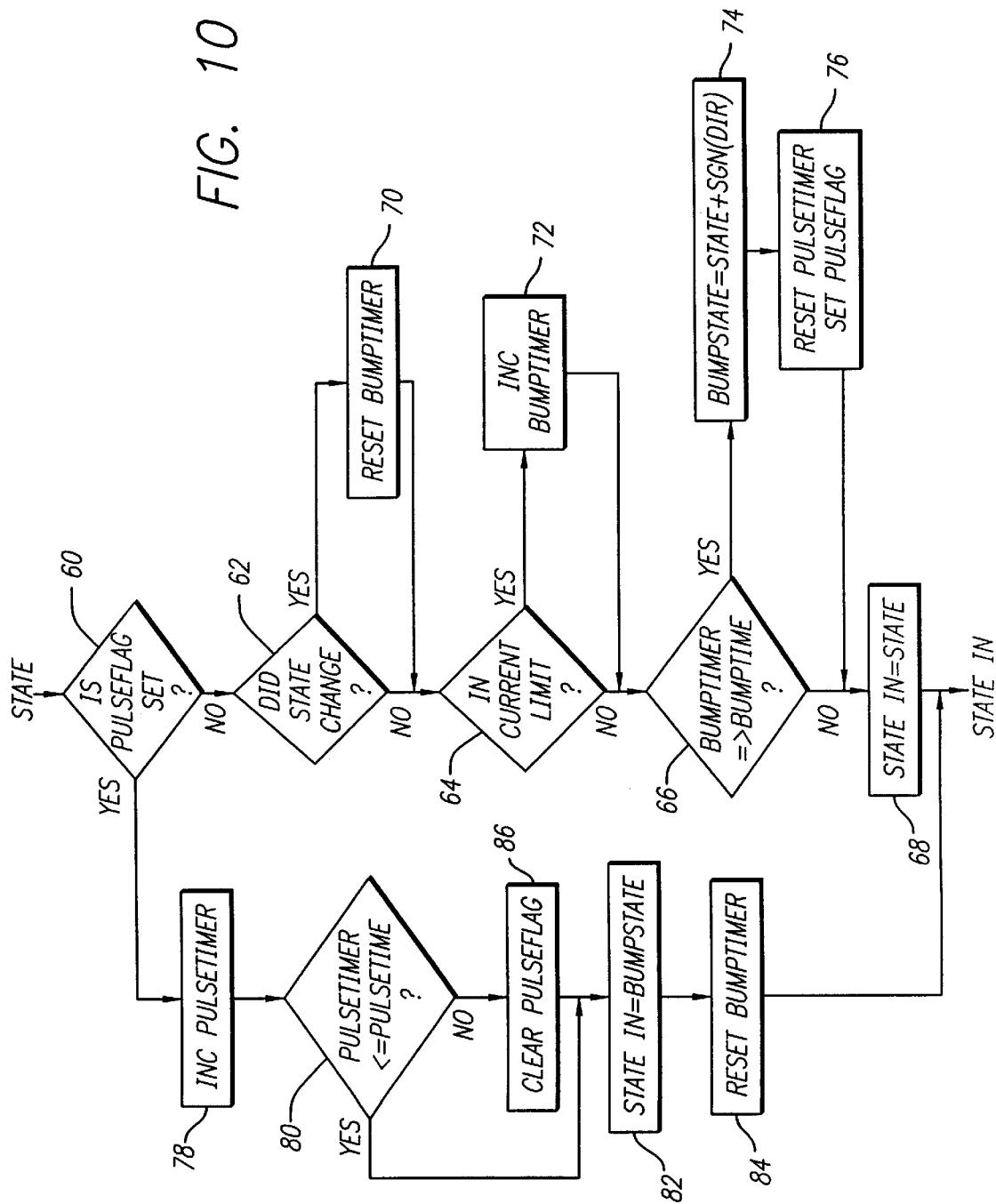
FIG. 10 is flow chart illustrating an alternative arrangement of a state advance commutation loop in accordance with the present invention.

By referring now to FIG. 10, there is shown an alternative embodiment of the present invention wherein there is a fixed bump pulse or signal irrespective of whether or not there was a change of state once the motor is in current limit and the bump timer has been activated and has timed out. Again, the flow chart as illustrated in FIG. 10 will be processed in accordance with the clock frequency which is many times greater than the frequency of the change of state of the motor.

As is shown in FIG. 10, the information regarding the state change is applied to the block 60 which determines whether or not a pulse flag has been set in the system. If NO, then the signal is applied to the block 62 which requests whether or not a change of state has occurred. If the answer is NO, then the signal is applied to the block 64 which determines whether or not the motor is in current limit. If the answer is NO, then has the bump timer equaled or exceeded the bump time as shown at block 66, since the bump timer has not been incremented at this point, the answer would be NO. This would immediately fall through to the State In is equal to State as shown at 68 and the process would again start as above described upon the next incrementation of a clock pulse.

Assume that the state did change as shown at 62, the signal would then be YES. This would then be applied to the block 70 which would reset the bump timer. Thus as was the case in the previous embodiment, every time a state changes, the bump timer is reset. Now assume that when the signal is applied to the block 64 the answer is that the motor is in current limit. This would then be applied to the block 72 which would cause the bump timer to be incremented. When the output of the bump timer is then applied to the block 66 it would, since it has just been started, be in a situation such that the timer is not equal to or greater than the bump time, that is, the 10 milliseconds, as above referred to. Such being the case, the output would be at the NO falling to the block 68 and the process would start again. Assume that the process has continued a sufficient number of clock pulses through until the bump timer has now exceeded the bump time, that is, the 10 milliseconds. The output would then be YES and this would be applied to the block 74 which would activate the bump and the bump state would be the state plus the sign of the direction that is positive or negative, so that the excitation to the rotor would be advanced to the next succeeding state either negatively or positively depending upon the direction of rotation. When such occurs the signal is applied to the block 76 which will reset the pulse timer and will set the pulse flag. The output then would be applied to the block 68 and the process would then again start. When the process starts on the next clock pulse, and is applied to block 60, is the pulse flag set, this would then be answered YES and would be applied to the block 78 which would increment the pulse timer. Such would then be applied to block 80 which asks the question whether or not the pulse timer is equal to or less than the pulse time, that is the 5 milliseconds, as above indicated. Since the pulse timer was just incremented the answer would be YES. The pulse timer is less than the 5 milliseconds then the signal would be applied to the block 82 indicating that the state in which the motor is presently residing is the bump state and the output thereof would applied to block 84, which would reset the bump timer since it is no longer in operation at this point in time and has exceeded the bump time. This would continue to process through for the 5 millisecond timeout period for the pulse timer. When such occurs, then when the signal is applied to the block 80 asking the question whether or not the pulse timer is less than or equal to the pulse time, the answer would be NO, because it has exceeded the pulse time at this point. When such occurs, the output is applied to the block 86 which would clear the pulse flag and the output signal would be applied to the block 82 and subsequently to the block 84 indicating the state in which the motor is in the bump state. Since the pulse flag has been cleared and the bump timer has been reset, the process would now again start over as above described. As can be seen, once the pulse timer has been incremented the bump state remains irrespective of what occurs with regard to a state change. This occurs simply because the query regarding the state change has been bypassed by setting the pulse flag. Once the pulse timer times out, then the change of state becomes an appropriate query.

Figure 11:
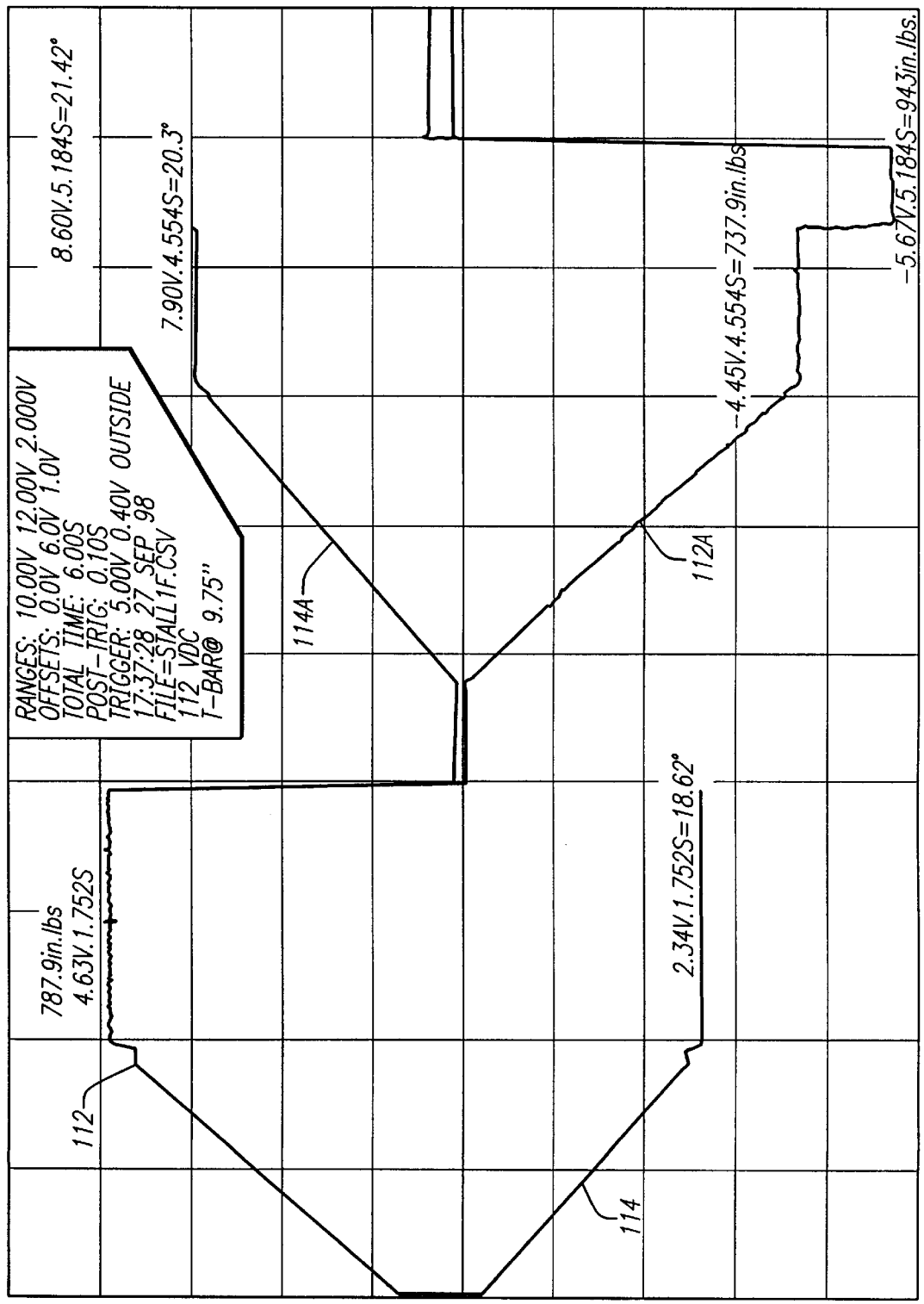
FIG. 11 are curves illustrating the torque and position of a motor driven to its maximum position without the features of the present invention.
Figure 12:
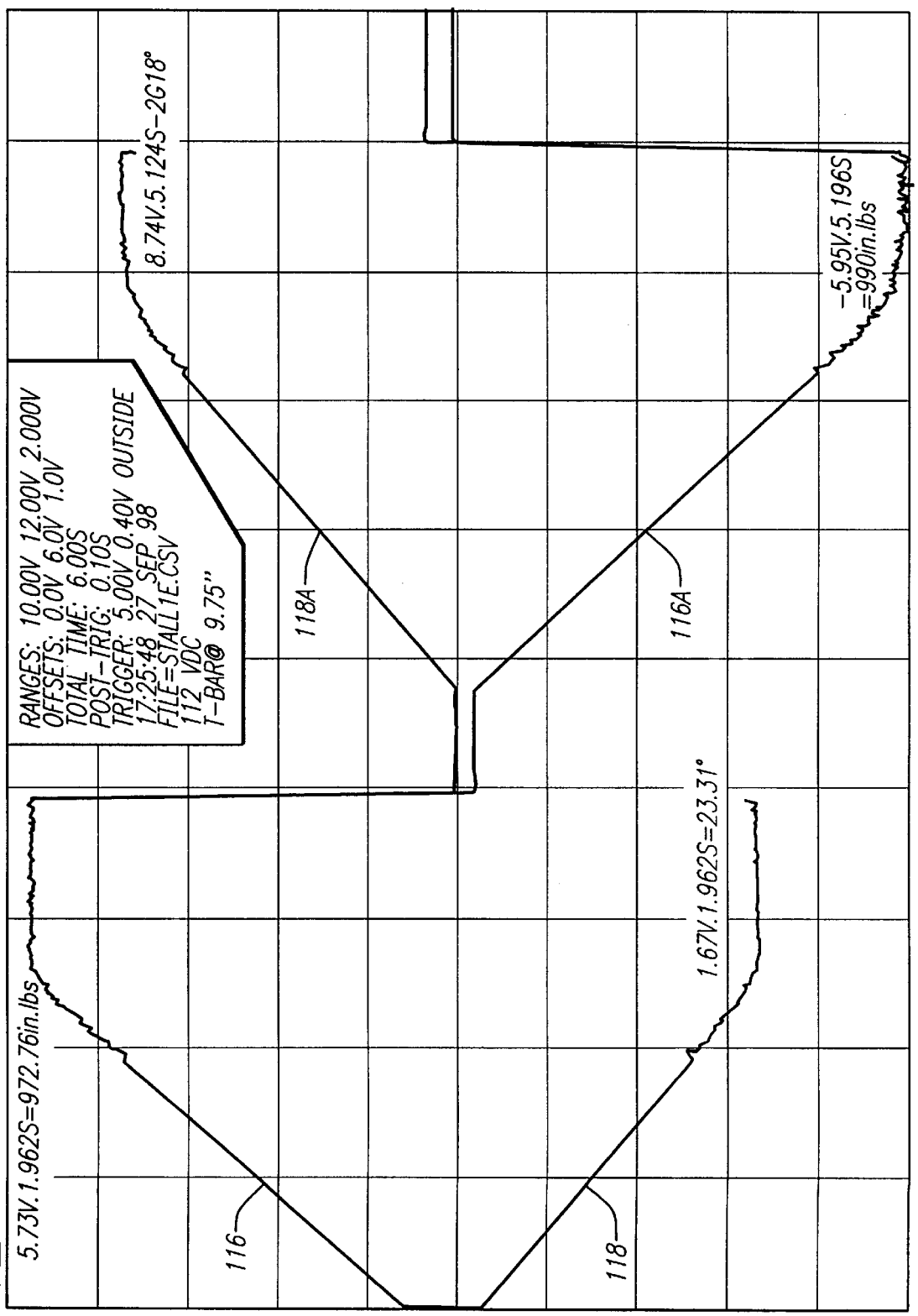
FIG. 12 is an illustration of curves similar to those of FIG. 11 but with the state advance enhancement of the present invention applied thereto.

Referring now more particularly to FIGS. 11 and 12, there are illustrated graphs which show the performance of a motor without the state jump in FIG. 11 and with the state jump in FIG. 12 to provide a comparison of the improvement in the performance of the motor when the State Advanced Controller Commutation Loop of the present invention is implemented in the motor.

As is illustrated in FIG. 11, the curve 112 represents the amount of torque which is generated by driving the motor through a gear train and against a torsion bar until stall occurs. The curve 114 represents the amount of rotation or position of the rotor to accomplish the stall condition. As can be seen, when commanded in a first direction as shown by the curves 112 and 114, the motor achieved a position of approximately 18.62 degrees of rotation and generated 787.9 inch pounds of torque. At this point, the motor direction was commanded to reverse and as a result, the torsion now appears on a lower portion of the curve at 112A while the rotational position is on the upper part of the curve at 114A and as can be seen in the reverse position the final torque generated was approximately 943 inch pounds at 21.42 degrees.

Referring now to FIG. 12 there is illustrated the same motor, but with the enhanced state invention of the present invention applied. As can be seen on the curves 116 and 118 the motor was able to generate 972.76 inch pounds of torque and achieve a position of 23.31 degrees when commanded in the first direction, as shown at curves 116 and 118, respectively. When commanded in the reverse direction, as shown by the curves 116A and 118A, respectively, 990 inch pounds of torque were generated in a position of 26.18 degrees was generated. As can be seen by comparing the performance of the motor a substantial improvement in that almost 185 inch pounds of more torque was generated in the first direction with the improvement than without and 4.69 degrees of rotation more. Thus can be seen there is a substantial improvement by utilizing the State Advance Controller Commutation Loop in accordance the principals of the present invention.

Although throughout the previous discussion a Hall sensor has been referred to as the device to detect a change of state, it will be recognized by those skilled in the art that other devices may be utilized for the same purposes. For example, an RVDT, a resolver, a potentiometer or other position transducer can be utilized, for example, in conjunction with an analogue to digital converter, comparators or the like.

Figure 13:
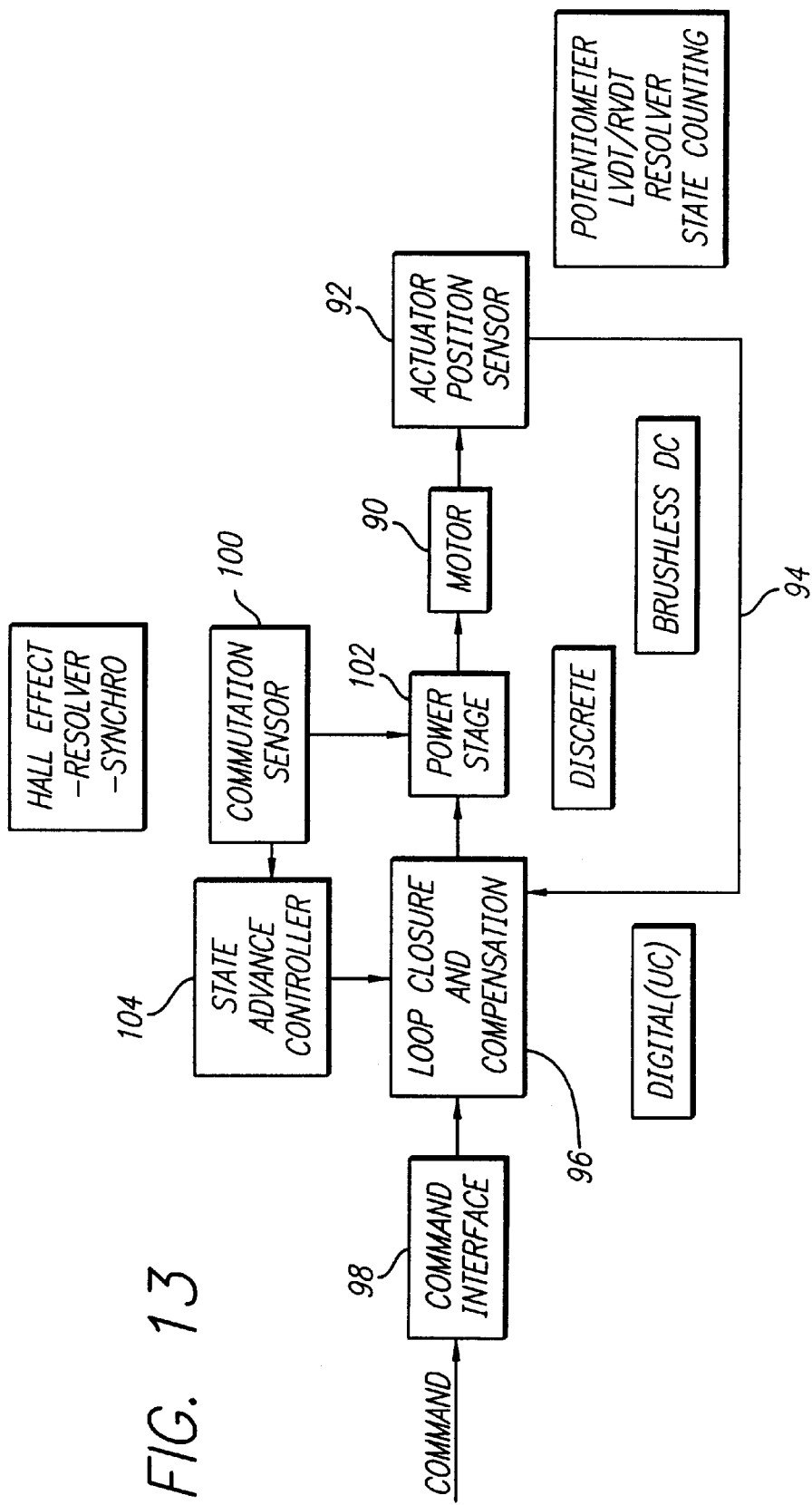
FIG. 13 is a block diagram of a system utilizing the state advance enhancement of the present invention.

Referring now to more particularly to FIG. 13, there is shown a block diagram of a brushless D.C. motor which incorporates the State Advance Controller Commutation Loop in accordance with the principles of the present invention. As is therein illustrated, the motor 90 includes an actuation position sensor 92 which is above-described is preferably a Hall effect sensor structure which counts the states. It however may be a potentiometer, an LVDT, an RVDT or a resolver. The output of the actuation commutation sensor is feedback as shown by the lead 94 to a loop closure and compensation circuit 96. That circuit has a command interface 98 connected thereto which receives command signals. Also connected thereto, is a commutation sensor 100 which also may be a Hall effect device, a resolver or a synchro which provides the appropriate commutation to the power stage 102. Connected to the commutation sensor 100 is the state advance controller 104 which serves as an additional input to the loop closure and compensation. The structure of the motor as disclosed in FIG. 14 when incorporating the state advance controller provides exceptional improvement in the torque available without the state advance controller.

As additional modifications to the state advance controller above discussed are ways in which to detect when the motor has in fact entered a stall state and starts slipping or rotating in the opposite direction. One may detect multiple state changes in the reverse direction from that which has been commanded and utilize that as a signal to cause the controller to bump state. A velocity threshold detection apparatus may also be utilized to accomplish the same thing and to clear the state advance in the event that the motor has truly stalled. An additional variation is that once the current limit has been detected, one can bump the state and then stay in that condition unless there is a state change.

There is thus been disclosed a State Advanced Controller Commutation Loop which may be used with brushless D.C. motors to enhance the torque and position characteristics thereof for a given load.

What is claimed is:

1. A method for improving the operational characteristics of an electronic commutated brushless direct current motor comprising:

(a) detecting when the motor is approaching a stall condition of operation;

(b) initiating a timing sequence of a predetermined time in response to the approaching stall condition being detected;

(c) detecting whether a change of commutation state has occurred during the timing sequence; and (d) advancing the commutation state to the next succeeding state in the absence of a change of commutation state during the timing sequence predetermined time.

2. A method for improving the operational characteristics of a brushless direct current motor as defined in claim 1 wherein said step of detecting approaching motor stall includes measuring current flow applied to the motor.

3. A method as defined in claim 2 which further includes determining whether current flow has reached a magnetic saturation point for the motor.

4. A method as defined in claim 1 which further includes the step of resetting the timing sequence to zero when a change of commutation in state is detected.

5. A method as defined in claim 1 which includes the further steps of:

initiating a second timing sequence of a second predetermined time after said predetermined time expires and in the absence of a change of commutation state; and returning said motor to its commutation state as it existed immediately prior to said advance in the absence of a change of commutation state during said second predetermined time.

6. An electronic commutated brushless direct current motor state advance controller comprising:

means for detecting an approaching stall condition of said motor;

means for detecting a change of commutative state of said motor;

a timer;

means for activating said timer when said stall condition is detected; and a controller for advancing the commutation state to the next successive state in the absence of a change of state while said timer is activated.

7. An electronic commutated brushless direct current motor state advance controller as defined in claim 6 wherein said means for detecting stall condition includes means for measuring the current flowing through said motor.

8. An electronic commutated brushless direct current motor state advance controller as defined in claim 6 wherein said means for detecting a change of state includes a Hall effect device.

* * * * *